(12) United States Patent
Dehnicke et al.

(10) Patent No.: US 11,987,730 B2
(45) Date of Patent: May 21, 2024

(54) WATERBASED ONE COAT ADHESIVE COMPOSITION

(71) Applicant: DDP SPECIALTY ELECTRONIC MATERIALS US, LLC, Wilmington, DE (US)

(72) Inventors: Stefan Dehnicke, Neu Isenburg (DE); Gerd Becker, Schwalbach (DE); Anna Osichow, Wiesbaden (DE); Philipp Zutavern, Neu Isenburg (DE); Gerald Wessling, Neu Isenburg (DE); David Kistner, Neu Isenburg (DE)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 926 days.

(21) Appl. No.: 16/978,982

(22) PCT Filed: Mar. 12, 2019

(86) PCT No.: PCT/US2019/021737
§ 371 (c)(1),
(2) Date: Sep. 8, 2020

(87) PCT Pub. No.: WO2019/209418
PCT Pub. Date: Oct. 31, 2019

(65) Prior Publication Data
US 2020/0407605 A1    Dec. 31, 2020

Related U.S. Application Data

(60) Provisional application No. 62/661,183, filed on Apr. 23, 2018.

(51) Int. Cl.
| | | |
|---|---|---|
| C09J 111/02 | (2006.01) | |
| C08J 5/12 | (2006.01) | |
| C08K 3/04 | (2006.01) | |
| C08K 3/22 | (2006.01) | |
| C08K 3/32 | (2006.01) | |
| C08K 5/32 | (2006.01) | |
| C08K 11/00 | (2006.01) | |
| C09J 115/02 | (2006.01) | |
| C09J 123/34 | (2006.01) | |

(52) U.S. Cl.
CPC .............. *C09J 111/02* (2013.01); *C08J 5/127* (2013.01); *C08K 3/04* (2013.01); *C08K 3/22* (2013.01); *C08K 3/32* (2013.01); *C08K 5/32* (2013.01); *C08K 11/005* (2013.01); *C09J 115/02* (2013.01); *C09J 123/34* (2013.01); *C08K 2003/2296* (2013.01); *C08K 2003/327* (2013.01); *C09J 2400/163* (2013.01); *C09J 2400/166* (2013.01)

(58) Field of Classification Search
None
See application file for complete search history.

(56) References Cited

U.S. PATENT DOCUMENTS

| | | |
|---|---|---|
| 3,018,290 A | 1/1962 | Sauers et al. |
| 4,308,365 A | 12/1981 | Czerwinski |
| 4,988,753 A | 1/1991 | Rullmann et al. |
| 5,036,122 A | 7/1991 | Auerbach et al. |
| 5,200,455 A | 4/1993 | Warren |
| 5,268,404 A | 12/1993 | Mowrey |
| 5,478,654 A | 12/1995 | Hargis et al. |
| 5,962,576 A * | 10/1999 | Dehnicke .............. C08J 5/127 524/510 |
| 6,600,005 B1 | 7/2003 | Dehnicke et al. |
| 2019/0112509 A1* | 4/2019 | Dehnicke ............... C08L 23/34 |

FOREIGN PATENT DOCUMENTS

| | | |
|---|---|---|
| JP | 2007100003 | 4/2007 |
| WO | 199312189 | 6/1993 |
| WO | 9407968 | 4/1994 |
| WO | 94/25536 | 11/1994 |
| WO | 2017176625 | 10/2017 |
| WO | WO-2017176625 A1 * | 10/2017 ............. B32B 15/06 |

OTHER PUBLICATIONS

JP2007100003 Abstract.

* cited by examiner

*Primary Examiner* — Christopher M Rodd

(57) ABSTRACT

Disclosed is an aqueous adhesive composition which comprises an admixture of: (a) a first aqueous composition comprising, (i) one or more film forming polymers, (ii) one or more lower crystallinity polynitroso compounds, (iii) one or more higher crystallinity polynitroso compounds, and (iv) one or more bismaleimide-containing monomers; and (b) a second aqueous composition comprising (i) an aqueous dispersion of at least one phenolic resin which is a condensation product of a phenol and formaldehyde, wherein the aqueous dispersion is stabilized by at least one polyacrylate; (b) one or more latices formed from one or more halogenated polyolefins; and (c) one or more metal oxides.

20 Claims, No Drawings

WATERBASED ONE COAT ADHESIVE COMPOSITION

FIELD

The present invention relates to a waterbased one coat adhesive composition for bonding rubber to a rigid substrate.

BACKGROUND

Bonding of vulcanizable rubber to rigid substrates such as metals is being used extensively in virtually all modern transport systems. The technology involves bringing together unvulcanized rubbers and bonding agent coated rigid substrates during the vulcanization process of the rubber. A strong bond is formed which is resistant to mechanical stress, variations in temperature and to a variety of adverse environmental conditions. The bonded components which combine the vulcanized rubber to the rigid substrate are composites of highly dissimilar materials. For example, the combination of flexible (rubber) and rigid (metallic and/or non-metallic) materials gives a composite with unique mechanical properties, and the materials are selected to give a component with specific technical capabilities, designed for a particular application or range of applications.

Due to the stringent technical requirements on modern rubber to rigid substrate bonded composites, the majority of in-mold bonded rubber components use a two-coat system such as a primer plus bonding agent system. The use of two compatible coatings allows for the optimization of the bonding agent system. The primer can be specifically formulated/designed to bond to the rigid substrate as well as being fully compatible with the bonding agent. The bonding agent can be formulated/designed to give optimum bonding performance to the rubber substrate as well as being fully compatible with the primer.

However, a reduction in the manufacturing steps and the use of solvents during the production of bonding rubber to rigid substrates are desired. Therefore, adhesive technologies that can bond rubber to rigid substrates without applying two coating layers would be a significant advantage.

Thus, it would be desirable for a one coat application for bonding rubber to a rigid substrate versus two coat application.

SUMMARY

In one illustrative embodiment, an aqueous adhesive composition is provided which comprises an admixture of:
(a) a first aqueous composition comprising, (i) one or more film forming polymers, (ii) one or more lower crystallinity polynitroso compounds, (iii) one or more higher crystallinity polynitroso compounds, and (iv) one or more bismaleimide-containing monomers; and
(b) a second aqueous composition comprising (i) an aqueous dispersion of at least one phenolic resin which is a condensation product of a phenol and formaldehyde, wherein the aqueous dispersion is stabilized by at least one polyacrylate derived from a monomer represented by Formula I:

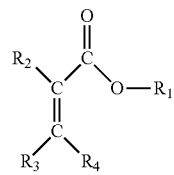

wherein $R_1$ is H, $CH_3$, $C_2$ to $C_4$ alkyl or $C_6$ to $C_{12}$ aryl; $R_2$ is H, OH, CN, $CH_3$, $C_2$ to $C_8$ alkyl, or a halogen; and $R_3$ and $R_4$ are each independently H, $CH_3$, $C_2$ to $C_8$ alkyl, $C_6$ to $C_{12}$ aryl, O—$CH_3$, O—$C_2$ to $C_8$ alkyl, and O-aryl; (b) one or more latices formed from one or more halogenated polyolefins; and (c) one or more metal oxides.

In one illustrative embodiment, a bonded assembly is provided comprising;
(a) a rigid substrate having an interfacial bond area,
(b) a vulcanized rubber; and
(c) an aqueous adhesive composition bonding the rigid substrate to the vulcanized rubber; wherein the aqueous adhesive composition comprises an admixture of:
(i) a first aqueous composition comprising, (1) one or more film forming polymers, (2) one or more lower crystallinity polynitroso compounds, (3) one or more higher crystallinity polynitroso compounds, and (4) one or more bismaleimide-containing monomers; and
(ii) a second aqueous composition comprising (1) an aqueous dispersion of at least one phenolic resin which is a condensation product of a phenol and formaldehyde, wherein the aqueous dispersion is stabilized by at least one polyacrylate derived from a monomer represented by Formula I:

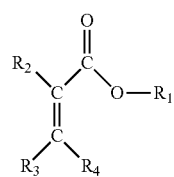

wherein $R_1$ is H, $CH_3$, $C_2$ to $C_4$ alkyl or $C_6$ to $C_{12}$ aryl; $R_2$ is H, OH, CN, $CH_3$, $C_2$ to $C_8$ alkyl, or a halogen; and $R_3$ and $R_4$ are each independently H, $CH_3$, $C_2$ to $C_8$ alkyl, $C_6$ to $C_{12}$ aryl, O—$CH_3$, O—$C_2$ to $C_8$ alkyl, and O-aryl; (2) one or more latices formed from one or more halogenated polyolefins; and (3) one or more metal oxides.

In one illustrative embodiment, a method for bonding rubber to a rigid substrate is provided, which comprises:
(a) interposing an aqueous adhesive composition between a rigid substrate and an unvulcanized rubber to form an assemblage, wherein the aqueous adhesive composition comprises (i) a first aqueous composition comprising, (a) one or more film forming polymers, (2) one or more lower crystallinity polynitroso compounds, (3) one or more higher crystallinity polynitroso compounds, and (4) one or more bismaleimide-containing monomers; and
(ii) a second aqueous composition comprising (1) an aqueous dispersion of at least one phenolic resin which is a condensation product of a phenol and formaldehyde, wherein the aqueous dispersion is stabilized by at least one polyacrylate derived from a monomer represented by Formula I:

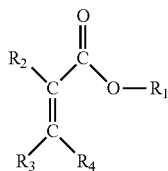

wherein $R_1$ is H, $CH_3$, $C_2$ to $C_4$ alkyl or $C_6$ to $C_{12}$ aryl; $R_2$ is H, OH, CN, $CH_3$, $C_2$ to $C_8$ alkyl, or a halogen; and $R_3$ and $R_4$ are each independently H, $CH_3$, $C_2$ to $C_8$ alkyl, $C_6$ to $C_{12}$ aryl, O—$CH_3$, O—$C_2$ to $C_8$ alkyl, and O-aryl; (2) one or more latices formed from one or more halogenated polyolefins; and (3) one or more metal oxides; and (b) heating the assemblage to a vulcanization temperature under pressure and for a time sufficient to vulcanize the unvulcanized rubber and the aqueous adhesive composition thereby bonding the rubber to the rigid substrate.

The aqueous adhesive composition of the present invention advantageously bonds unvulcanized rubber to a rigid substrate using a one coating application. In addition, the aqueous adhesive composition is stable thereby allowing for the unvulcanized rubber and rigid substrate to be adhered together without an additional coating step while also avoiding the use of any solvent based adhesive.

DETAILED DESCRIPTION

Disclosed is an aqueous adhesive composition which comprises an admixture of: (a) a first aqueous composition comprising, (i) one or more film forming polymers, (ii) one or more lower crystallinity polynitroso compounds, (iii) one or more higher crystallinity polynitroso compounds, and (iv) one or more bismaleimide-containing monomers; and (b) a second aqueous composition comprising (i) an aqueous dispersion of at least one phenolic resin which is a condensation product of a phenol and formaldehyde, wherein the aqueous dispersion is stabilized by at least one polyacrylate derived from a monomer represented by Formula I:

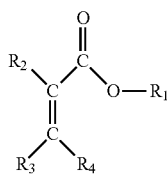

wherein $R_1$ is H, $CH_3$, $C_2$ to $C_4$ alkyl or $C_6$ to $C_{12}$ aryl; $R_2$ is H, OH, CN, $CH_3$, $C_2$ to $C_8$ alkyl, or a halogen; and $R_3$ and $R_4$ are each independently H, $CH_3$, $C_2$ to $C_8$ alkyl, $C_6$ to $C_{12}$ aryl, O—$CH_3$, O—$C_2$ to $C_8$ alkyl, and O-aryl; (b) one or more latices formed from one or more halogenated polyolefins; and (c) one or more metal oxides. The term "one or more" as used herein shall be understood to mean that at least one, or more than one, of the recited components may be used.

The first aqueous composition of the aqueous adhesive composition according to the present invention includes one or more film forming polymers that are polymers which form a film when a layer of that polymer in the adhesive composition is applied to a substrate. In general, the one or more film forming polymers are dispersed in an aqueous solution and are water-insoluble. The one or more film forming polymers also generally have at least one group that may react with a nitroso group such as a carbon-carbon double bond. Suitable one or more film forming polymers include, for example, an olefin polymer, which may be substituted or unsubstituted or a mixture thereof. Olefin polymers, also called polyolefins, include polymers based on monomer molecules that are unsaturated aliphatic hydrocarbons containing one double bond per molecule. Suitable olefin polymers include, for example, polyethylene, polypropylene, polyisobutene, polybutene, polymethylpentene, and the various copolymers thereof. In addition, other olefin polymers that can be used herein include polymers based on natural rubber or synthetic rubbers such as, for example, polyisoprene, polybutadiene, polymers of adducts of butadiene and cyclic conjugated dienes, copolymers of butadiene and styrene, copolymers of ethylene, propylene, and dienes, copolymers of acrylonitrile and butadiene, and various copolymers thereof. The olefin polymers described above can include one or more multi-functional monomers to provide crosslinking.

In one embodiment, the polyolefin may be halogenated. A halogenated polyolefin may have a structure that is the same as those of an unsubstituted polyolefin, except that one or more halogen atoms will replace one or more of the hydrogen atoms. Suitable halogen atoms include, for example, chlorine, bromine, fluorine, or a mixture thereof. In some embodiments, suitable halogens include, for example, chlorine, bromine, or a mixture thereof. In some embodiments, the halogen is chlorine. The amount of halogen is not critical and can range from 3 to 70 percent by weight of the one or more film forming polymers.

In one embodiment, a halogenated polyolefin for use in the first aqueous composition may be substituted with bromine, which is a halogenated olefin polymer in which at least one halogen is bromine. A bromine substituted olefin polymer may or may not contain atoms of halogens other than bromine. In another embodiment a halogenated polyolefin for use in the first aqueous composition may be substituted with chlorine, which is a halogenated olefin polymer in which at least one halogen is chlorine. A chlorine substituted polyolefin may or may not contain atoms of halogens other than chlorine. For example, a chlorine substituted olefin polymer is a chlorinated polyolefin, which is an olefin polymer in which all the substituents are chlorine. A suitable chlorinated polyolefin includes, for example, a chlorinated polyethylene (CPE).

In another embodiment, a halogenated polyolefin for use in the first aqueous composition is a mixed-halogen polyolefin, which is a halogenated polyolefin that has two or more different types of halogen atoms. In some embodiments, a mixed-halogen substituted olefin polymer is one that is substituted with chlorine and bromine. A suitable mixed-halogen substituted olefin polymer includes, for example, a brominated polydichlorobutadiene ("BPDCD") or a polymer latex based on brominated 2,3 dichlorobutadiene (ca. 40% in water).

In some embodiments, at least one halogenated polyolefin in the first aqueous composition that has no substituent on the olefin polymer selected from nitrile, carboxyl, carboxylate ester, ether, peroxyester, or combination thereof. In some embodiments, each halogenated olefin polymer in the first aqueous composition has no substituent on the olefin polymer selected from nitrile, carboxyl, carboxylate ester, ether, peroxyester, or combination thereof. In some embodiments, at least one halogenated polyolefin in the first aqueous composition has no substituent on the olefin polymer other than halogen. In some embodiments, every halogenated polyolefin in the first aqueous composition has no substituent on the olefin polymer other than halogen.

In another embodiment, one or more film forming polymers include at least one halosulfonated polyolefin, which is a polymer that has the structure of unsubstituted olefin polymer in which some hydrogen atoms are replaced by halogen atoms and in which some other hydrogen atoms are replaced by sulfonyl halide groups, which have the chemical formula $SO_2X$, where X is a halogen atom. Suitable halogens include, for example, chlorine, bromine, fluorine, or a mixture thereof. In some embodiments, suitable halogens include, for example, chlorine, bromine, or a mixture thereof. In some embodiments, the halogen is chlorine. In some embodiments, every halogen in the halosulfonated olefin polymer is either chlorine or bromine. In some embodiments, every halogen in the halosulfonated olefin polymer is chlorine.

In another embodiment, one or more film forming polymers include a substituted polydiene polymer, which is a polymer that has the structure of a polydiene polymer where one or more halogen atoms are substituted for some hydrogen atoms. Suitable polydiene polymers include, for example, polybutadiene, polyisoprene, and mixtures thereof. In one embodiment, suitable polydiene polymers have no monomer units that are not residues of diene molecules. In some embodiments, every halogenated olefin polymer in the first adhesive composition is a substituted polydiene polymer in which no monomer units are other than residues of diene molecules.

In general, the one or more film forming polymers are present in the first aqueous composition in an amount of 2 wt. % to 75 wt. %, based on the total weight of the first aqueous composition. In one embodiment, the one or more film forming polymers are present in the first aqueous composition in an amount of 5 wt. % to 40 wt. %, based on the total weight of the first aqueous composition.

The first aqueous composition further includes one or more lower crystallinity polynitroso compounds and one or more higher crystallinity polynitroso compounds. In both of the polynitroso compounds there is an amorphous component that generally has no or a minor ordered molecular structure and/or is of a very fine particulate size such that little or no order is detectable using typical analytical techniques such as X-ray diffraction. The term "crystalline" as used herein means that there are distinct crystalline diffraction peaks exhibited in X-ray diffraction and generally the particulates of the higher crystallinity polynitroso compound exhibit faceting when observed microscopically (e.g., scanning electron microscopy).

In general, a polynitroso compound is an aromatic hydrocarbon containing at least two nitroso groups attached directly to non-adjacent nuclear carbon atoms. By the term "nuclear carbon atom" we mean a carbon atom that is part of an aromatic ring. Suitable aromatic compounds include, for example, aromatic compounds having 1 to 3 aromatic nuclei, including fused aromatic nuclei. For example, suitable aromatic compounds include benzene, naphthalene, biphenyl and anthracene. Suitable polynitroso compounds may have 2 to 6 nitroso groups attached directly to non-adjacent nuclear carbon atoms. In addition, polynitroso compounds can also include substituted polynitroso compounds, in which one or more hydrogen atoms attached to the nuclear carbon atoms are replaced by organic or inorganic substituent groups, e.g., e.g., alkyl, alkoxy, cycloalkyl, aryl, aralkyl, alkaryl, arylamine, arylnitroso, amino, and halogen.

In one embodiment, a lower crystallinity polynitroso compound and/or high crystallinity polynitroso compound can have the chemical formula $R_m$—Ar—$(NO)_2$, where Ar is phenylene or naphthalene; R is a monovalent organic radical having 1 to 20 carbon atoms, an amino group, or a halogen; and m is 0, 1, 2, 3, or 4. If m is greater than 1, the R groups may be the same or different from each other. R is, in some embodiments, an alkyl, cycloalkyl, aryl, aralkyl, alkaryl, arylamine, or alkoxy radical with 1 to 20 carbon atoms. In one embodiment, R is an alkyl group with 1 to 8 carbon atoms. In some embodiments, the value of m is zero.

Suitable polynitroso compounds include, for example, m-dinitrosobenzene; p-dinitrosobenzene; m-dinitrosonaphthalene; p-dinitrosonaphthalene; 2,5-dinitroso-p-cymene; 2-methyl-1,4-dinitrosobenzene; 2-methyl-5-chloro-1,4-dinitrosobenzene; 2-fluoro-1,4-dinitrosobenzene; 2-methoxy-1,3-dinitrosobenzene; 2-benzyl-1,4-dinitrosobenzene; 2-cyclohexyl-1,4,-dinitrosobenzene; and mixtures thereof. In one embodiment, the one or more polynitroso compounds used include dinitrosobenzenes, substituted dinitrosobenzenes, dinitrosonaphthalenes, substituted dinitrosonaphthalenes, and mixtures thereof.

Also included in the class of polynitroso compounds are compounds as described above which exist in polymeric form, as described in, for example, U.S. Pat. Nos. 4,308,365, and 5,478,654. In some embodiments, the one or more polynitroso compound used is selected from the polymeric form of p-dinitrosobenzene, the polymeric form of 1,4-dinitrosonaphthalene, and mixtures thereof. In some embodiments, the polymeric form of 1,4-dinitrosobenzene is used.

The one or more lower crystallinity polynitroso compounds and one or more higher crystallinity polynitroso compounds are known and commercially available from, for example, Lord Germany Feinchemie GmbH, Germany under the trade names: PPDNB 1A 30X; PPDNB 1A 50W PPDNB 2A 30X; PPDNB 2A 50W; PPDNB C 50W and PPDNB $C_{30}X$. Also, processes for making the one or more lower crystallinity polynitroso compounds and one or more higher crystallinity polynitroso compounds are known, e.g., see col. 1, line 19 to col. 2, line 28 of U.S. Pat. No. 6,600,005 and in WO 2017176625.

In general, the lower crystallinity polynitroso compound such as p-PDNB has a crystallinity of at most 33% by weight of the total weight of the polynitroso compound as determined by X-ray diffraction. In one embodiment, the lower crystallinity polynitroso compound has a crystallinity of at most 30% by weight of the total weight of the p-PDNB as determined by X-ray diffraction. Generally, the higher crystallinity p-PDNB has a crystallinity that is greater than 33% by weight of the total weight of the polynitroso compound as determined by X-ray diffraction. In general, the higher crystallinity polynitroso compound such as p-PDNB has a crystallinity that is at least 35%, or at least 40% or at least 45% by weight of the total weight of the polynitroso compound as determined by X-ray diffraction. Regardless of the particular crystallinities of the polynitroso compound, the weight ratio of the crystallinity of the higher p-PDNB compound to the lower crystallinity polynitroso compound is at least 1.25:1. In one embodiment, the weight ratio of the crystallinity of the higher p-PDNB compound to the lower crystallinity p-PDNB compound is at least 1.5:1. In one embodiment, the weight ratio of the crystallinity of the higher polynitroso compound to the lower crystallinity p-PDNB compound is at least 1.75:1.

In one embodiment, every polynitroso compound present in the first aqueous composition is selected from a polymeric form of p-dinitrosobenzene, the polymeric form of 1,4-dinitrosonaphthalene, and mixtures thereof, wherein at least one has lower crystallinity and another one has higher crystallinity. In another embodiment, every polynitroso compound present in the first aqueous composition is the polymeric form of p-dinitrosobenzene, in which the polymeric form of p-dinitrosobenzene is present in a lower crystallinity form and a higher crystallinity form. In one embodiment, the lower crystallinity polynitroso compound and the higher crystallinity polynitroso compound are provided in a weight ratio of lower polynitroso compound to the higher crystallinity polynitroso compound of 1:2 to 2:1 or 1.1:1 to 1:1.1.

In general, the one or more lower crystallinity polynitroso compounds are present in the first aqueous composition in an amount of 2 wt. % to 30 wt. %, based on the total weight of the first aqueous composition. In one embodiment, the one or more lower crystallinity polynitroso compounds are present in the first aqueous composition in an amount of 5 wt. % to 20 wt. %, based on the total weight of the first aqueous composition.

In addition, the one or more higher crystallinity polynitroso compounds are present in the first aqueous composition in an amount of 3 wt. % to 30 wt. %, based on the total weight of the first aqueous composition. In one embodiment, the one or more higher crystallinity polynitroso compounds are present in the first aqueous composition in an amount of 5 wt. % to 20 wt. %, based on the total weight of the first aqueous composition.

The first aqueous composition further includes one or more bismaleimide-containing monomers. In one embodiment, a bismaleimide-containing monomer can be a bismaleimide-containing monomer having the formula:

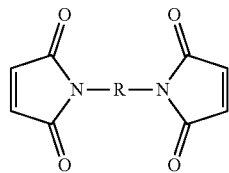

wherein R can be $C_1$ to $C_{30}$ alkylene, $C_3$ to $C_{12}$ cycloalkylene, $C_3$ to $C_{12}$ heterocyclic, $C_6$ to $C_{12}$ arylene, mixtures thereof, or one or more maleimide units. The alkylene, cycloalkylene, heterocyclic, and arylene groups can be optionally substituted with one or more substituents as known in the art. Suitable one or more bismaleimide-containing monomers include, for example, N,N'-ethylene-bismaleimide, N,N'-hexamethylene-bismaleimide, N,N'-meta-phenylene-bismaleimide, N,N'-para-phenylene-bismaleimide, N,N'-4,4'-biphenylene-bismaleimide, N,N'-4,4'-diphenylmethane-bismaleimide, N,N'-4,4'-(diphenyl ether)-bismaleimide, N,N'-4,4'-(diphenyl sulfide)-bismaleimide, N,N'-m-phenylenebismaleimide, 4,4'-diphenylmethanebismaleimide, N,N'-(4-methyl-m-phenylene)-bismaleimide, polyphenylmethanebismaleimide, N,N'-4,4'-diphenylsulfone-bismaleimide, N,N'-4,4'-dicyclohexylmethane-bismaleimide, N,N'-α,α-4,4'-dimethylenecyclohexane-bismaleimide, N,N'-meta-xylylene-bismaleimide, N,N'-para-xylylene-bismaleimide, N,N'-4,4'-(1,1-diphenylcyclohexane)-bismaleimide, N,N'-4,4'-diphenylmethane-bischloromaleimide, N,N'-4,4'-(1,1-diphenylpropane)-bis-maleimide, N,N'-4,4'-(1,1,1-triphenylethane)-bismaleimide, N,N'-4,4'-triphenylmethane-bismaleimide, N,N'-3,5-triazole-1,2,4-bismaleimide, N,N'-dodecamethylene-bismaleimide, N,N'-(2,2,4-trimethylhexamethylene)-bismaleimide, N,N'-4,4'-diphenylmethane-biscitraconimide, 1,2-bis-(2-maleimidoethoxy)-ethane, 1,3-bis-(3-maleimidopropoxy)-propane, N,N'-4,4'-benzophenone-bismaleimide, N,N'-pyridine-2,6-diyl-bismaleimide, N,N'-naphthylene-1,5-bismaleimide, N,N'-cyclohexylene-1,4-bismaleimide, N,N'-5-methylphenylene-1,3-bismaleimide and N,N'-5-methoxyphenylene-1,3-bismaleimide. The bismaleimide-containing monomer can be prepared by utilizing methods known in the art, for example, U.S. Pat. No. 3,018,290.

In general, the one or more bismaleimide-containing monomers are present in the first aqueous composition in an amount of 0.1 wt. % to 15 wt. %, based on the total weight of the first aqueous composition. In one embodiment, the one or more bismaleimide-containing monomers are present in the first aqueous composition in an amount of 1 wt. % to 10 wt. %, based on the total weight of the first aqueous composition.

The first aqueous composition may further contain one or more surfactants to disperse one or more components of the first aqueous composition. Suitable one or more surfactants may be any useful surfactant for dispersing one or more of the components such as a nonionic surfactant, anionic surfactant, amphoteric surfactant, cationic surfactant, or mixtures thereof. Suitable nonionic surfactants include, for example, alkoxylates, copolymers of ethylene oxide and propylene oxide, and mixtures thereof. Suitable alkoxylates include, for example, ethoxylates, which have the structure R—O—(—CH$_2$CH$_2$O—)$_x$—H where R is an aliphatic group, an aromatic group, an aliphatic-substituted aromatic group, and aromatic-substituted aliphatic group, or a mixture thereof; and x is from 5 to 200. In some embodiments R is alkyl-substituted benzene, with the structure $R_1$-$R_2$—, where $R_1$ is a linear alkyl group and $R_2$ is an aromatic ring. Examples of nonionic surfactant include nonyl phenol ethoxylate and fatty alcohol polyalkylene glycol ether.

In general a suitable amount of the nonionic surfactant present in the first aqueous composition can be 1 PHR or more, or 5 PHR or more, or 8 PHR or more. In one embodiment, a suitable amount of the nonionic surfactant present in the first aqueous composition can be 30 PHR or less, or 20 PHR or less, or 15 PHR or less. In some embodiments, the amount of nonionic surfactant present in the first aqueous composition can be 0.1 PHR or less, or 0.01 PHR or less. PHR means 100 times the ratio of the weight of that ingredient to the sum of the weights of all film-forming polymers in the first aqueous composition. The weights are dry weights in that preclude any weight of water.

In some embodiments, the first aqueous composition contains one or more anionic surfactant. When used, a suitable amount of the anionic surfactant present in the first aqueous composition can be 1 PHR or more, or 5 PHR or more; or 8 PHR or more. In one embodiment, a suitable amount of the anionic surfactant present in the first aqueous composition can be 30 PHR or less; or 20 PHR or less; or 15 PHR or less. In some embodiments, the amount of anionic surfactant present in the first aqueous composition can be 0.1 PHR or less, or 0.01 PHR or less. In some embodiments, no anionic surfactant is present in the first aqueous composition.

The first aqueous composition contains a sufficient amount of water to facilitate the formation of a coating of the resulting aqueous adhesive composition on the unvulcanizable rubber, substrate or both as discussed below. The first aqueous composition may further contain one or more additives as known in the art. For example, suitable additive include fillers, oxidizers, crosslinkers, and anti-corrosion pigments. Suitable fillers include, for example, carbon black, fumed silica, clay and other inorganic particulates. In general, the amount of filler present in the first aqueous composition can be from 2 wt. % to 30 wt. % or from 5 wt. % to 15 wt. %.

Suitable one or more anti-corrosion pigments include, for example, lead oxide, zinc oxide, and molybdate modified zinc oxide. In general, the amount of anti-corrosion pigment present in the first aqueous composition can be from 2 wt. % to 30 wt. % or from 5 wt. % to 15 wt. %.

The first aqueous composition may be made by mixing the components of the first aqueous composition in any suitable mixing method such as those known in the art. Suitable methods include, for example, ball milling, attrition milling, ribbon blending, high shear mixing (e.g., colloid mills) and paddle mixing. The first aqueous composition may have a Brookfield viscosity of from 10 to 400 centipoise (cPs) at 20° C. In one embodiment, the first aqueous composition may have a Brookfield viscosity of from 15 to 150 cPs at 20° C.

The second aqueous composition of the aqueous adhesive composition according to the present invention includes an aqueous dispersion of at least one phenolic resin which is a condensation product of a phenol and formaldehyde, wherein the aqueous dispersion is stabilized by at least one polyacrylate derived from a monomer represented by Formula I:

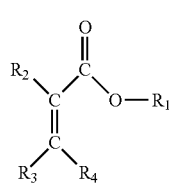

(I)

wherein $R_1$ is H, $CH_3$, $C_2$ to $C_4$ alkyl or $C_6$ to $C_{12}$ aryl; $R_2$ is H, OH, CN, $CH_3$, $C_2$ to $C_8$ alkyl, or a halogen; and $R_3$ and $R_4$ are each independently H, $CH_3$, $C_2$ to $C_8$ alkyl, $C_6$ to $C_{12}$ aryl, O—$CH_3$, O—$C_2$ to $C_8$ alkyl, and O-aryl. In one embodiment, a suitable halogen includes, for example, F, Cl or Br. In one embodiment, O-aryl is O—$C_6$ to $C_{12}$ aryl.

In general, the aqueous dispersion of at least one phenolic resin is present in the second aqueous composition in an amount of 2 wt. % to 30 wt. %, based on the total weight of the second aqueous composition. In one embodiment, the aqueous dispersion of at least one phenolic resin is present in the second aqueous composition in an amount of 3 wt. % to 20 wt. %, based on the total weight of the second aqueous composition.

The second aqueous composition further includes one or more latices formed from one or more halogenated polyolefins. The halogens employed in the halogenated polyolefins are chlorine or bromine, although fluorine can also be used. In addition, mixtures of halogens can also be employed in which case the halogen-containing polyolefins will have more than one type of halogen substituted thereon. The amount of halogen can range from 10 wt. % to 60 wt. %.

The halogenated polyolefin can comprise any natural or synthetic halogenated polyolefin. Suitable halogenated polyolefins include, for example, chlorinated natural rubber, chlorine- and bromine-containing synthetic rubbers including polychloroprene, chlorinated polychloroprene, chlorinated polybutadiene, hexachloropentadiene, butadiene/halogenated cyclic conjugated diene adducts, chlorinated butadiene styrene copolymers, chlorinated ethylene propylene copolymers and ethylene/propylene/non-conjugated diene terpolymers, chlorinated polyethylene, chlorosulfonated polyethylene, brominated poly(2,3-dichloro-1,3-butadiene), copolymers of alpha-haloacrylo-nitriles and 2,3-dichloro-1,3-butadiene, chlorinated poly(vinyl chloride), and mixtures thereof.

In one embodiment, the one or more latices formed from one or more halogenated polyolefins include, for example, an emulsion copolymer derived from the one or more halogenated polyolefins. In one embodiment, the one or more latices formed from one or more halogenated polyolefins include an emulsion copolymer derived from a chlorinated polyolefin and an ethylenically unsaturated monomer. Suitable ethylenically unsaturated monomers include, for example, (meth)acrylate-containing radicals, styrene-containing radicals, and vinyl-containing radicals. As used herein, the term "(meth)" denotes an optional methyl substituent. Thus, for example, terms such as "(meth)acrylate" denotes either methacrylate or acrylate. In one embodiment, the one or more latices formed from one or more halogenated polyolefins include an emulsion copolymer derived from 2-chlorobutadiene and an ethylenically unsaturated monomer. In one embodiment, the one or more latices formed from one or more halogenated polyolefins include an emulsion copolymer derived from 2-chlorobutadiene and methacrylic acid. The one or more latices formed from one or more halogenated polyolefins and their preparation are well-known to those skilled in the art.

In general, the one or more latices formed from one or more halogenated polyolefins are present in the second aqueous composition in an amount of 5 wt. % to 40 wt. %, based on the total weight of the second aqueous composition. In one embodiment, the one or more latices formed from one or more halogenated polyolefins are present in the second aqueous composition in an amount of 10 wt. % to 20 wt. %, based on the total weight of the second aqueous composition.

The second aqueous composition further includes one or more metal oxides. Suitable metal oxides include, for example, one or several oxides of the metals Mg, Al, Ca, Zn, Zr, Cd and Pb. In one embodiment, the one or more metal oxides are cross-linkers.

In general, the one or more metal oxides are present in the second aqueous composition in an amount of 3 wt. % to 30 wt. %, based on the total weight of the second aqueous composition. In one embodiment, the one or more metal oxides formed from one or more halogenated polyolefins are present in the second aqueous composition in an amount of 5 wt. % to 20 wt. %, based on the total weight of the second aqueous composition.

The second aqueous composition contains a sufficient amount of water to facilitate the formation of a coating of the resulting aqueous adhesive composition on the unvulcanizable rubber, substrate or both as discussed below. The second aqueous composition may further contain one or more additives as known in the art. For example, suitable additive include fillers, oxidizers, crosslinkers, and anti-corrosion pigments. Suitable fillers include, for example, carbon black, fumed silica, clay and other inorganic particulates. In general, the amount of filler present in the second aqueous composition can be from 2 wt. % to 30 wt. %, or from 5 wt. % to 20 wt. %.

The second aqueous composition may be made by mixing the components of the second aqueous composition in any suitable mixing method such as those known in the art.

Suitable methods include, for example, ball milling, attrition milling, ribbon blending, high shear mixing (e.g., colloid mills) and paddle mixing.

The aqueous adhesive composition according to the present invention can be formed by admixing the first and second aqueous compositions by any methods known in the art, e.g., high shear mixing (e.g., colloid mills) and paddle mixing. The aqueous adhesive composition according to the present invention can be admixed for a time period ranging from 30 minutes to 3 hours.

In one embodiment, the first aqueous composition is admixed with the second aqueous composition in a weight ratio of first aqueous composition to second aqueous composition of from 10:0.5 to 0.5:10. In one embodiment, the first aqueous composition is admixed with the second aqueous composition in a weight ratio of first aqueous composition to second aqueous composition of from 5:1 to 1:5. In one embodiment, the first aqueous composition is admixed with the second aqueous composition in a weight ratio of first aqueous composition to second aqueous composition of from 2:1 to 1:2. In one embodiment, the first aqueous composition is admixed with the second aqueous composition in a weight ratio of first aqueous composition to second aqueous composition of from 1:1.

The aqueous adhesive composition according to the present invention contains a sufficient amount of water to facilitate the formation of a coating of the aqueous adhesive composition on the unvulcanizable rubber, substrate or both. Accordingly, the aqueous adhesive composition according to the present invention can have a Brookfield viscosity of from 10 to 1500 cPs at 20° C. In one embodiment, aqueous adhesive composition according to the present invention can have a Brookfield viscosity of from 10 to 600 cPs at 20° C. In addition, the aqueous adhesive composition according to the present invention can have an amount of solids ranging from 10 to 65 by weight solids. In one embodiment, the aqueous adhesive composition according to the present invention can have an amount of solids ranging from 15 to 40 by weight solids.

The aqueous adhesive composition according to the present invention is used to bond various types of rubber (also known as elastomers both in crosslinked and noncrosslinked form) in a very wide range to a rigid substrate under vulcanizing conditions. Suitable rubbers include, for example, natural rubber; conjugated diene-based synthetic rubbers such as polyisoprene synthetic rubber (IR), polybutadiene rubber (BR), styrene-butadiene copolymer rubber (SBR), acrylonitrile-butadiene rubber (NBR), chloroprene rubber (CR) and butyl rubber (IIR); ethylene-alpha-olefin elastomers; ethylene/acrylic elastomer (AEM), polychloroprene rubber (CR), acrylonitrile butadiene rubber (NBR), hydrogenated NBR (HNBR), styrene-butadiene rubber (SBR), chlorosulfonated polyethylene (CSM, ACSM), epichlorohydrin (ECO), polybutadiene rubber (BR), polyisoprene-based elastomers (IR, IIR, CIIR, BIIR), chlorinated polyethylene (CPE), brominated polymethylstyrene-butene copolymers, styrene-butadiene-styrene (SBS) and styrene-ethylene-butadiene-styrene (S-E-B-S) block copolymers, acrylic rubber (ACM), ethylene vinyl acetate elastomer (EVM, EAM), and silicone rubber, or a combination of any two or more of the foregoing or blends thereof. Suitable ethylene-alpha-olefin elastomers include, for example, ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM). In one embodiment, the rubber component is a natural rubber, conjugated diene-based synthetic rubbers or both. The rubber component may be used singly or in combination of two or more.

The vulcanization of the rubber can be conducted in the presence of a vulcanizing agent. Suitable vulcanizing agents include, for example, sulfur, a thiuram polysulfide compound such as tetramethyl-thiuram disulfide and dipentamethylenethiuram tetrasulfide; 4,4-dithiomorpholine; p-quinonedioxime; p,p'-dibenzoquinone dioxime; cyclic sulfur imide; or a peroxide The rubber component may include any other combination of additives known in the art. For example, the one or more additives include fillers such as carbon black, silica and aluminum hydroxide, antioxidants and softeners. The rubber may be used as a composite material with particles, fibers and fabrics of various materials.

Suitable rigid substrates include, for example, metallic and nonmetallic materials. Suitable metallic materials include, for example, steel, stainless steel, which may or may not have been surface-treated, i.e., phosphitized, aluminum, copper, brass, bronze, nickel, zinc and their alloys. Suitable nonmetallic materials include, for example, plastic substrates such as polyamides, polyacetates, polyesters, polycarbonates, acrylonitrile butadiene styrene polymer (ABS) and polytetrafluoroethylene (PTFE), and woven fabrics made of glass fibers or of natural or synthetic organic molding compositions consisting of phenolic resins. In one embodiment, the rigid substrate is a metal. In one embodiment, the rigid substrate is steel. In one embodiment, the rigid substrate is plastic.

The aqueous adhesive composition according to the present invention can be applied to at least a portion of a surface of the rubber, rigid substrate or both by conventional methods. For example, the aqueous adhesive composition according to the present invention can be applied to at least a portion of a surface of the rubber, rigid substrate or both by brushing, spraying, roll-coating and dipping. In one embodiment, the aqueous adhesive composition according to the present invention can be applied to at least a portion of a surface of the rubber, rigid substrate or both at a thickness ranging from 5 to 70 μm. In one embodiment, the aqueous adhesive composition according to the present invention can be applied to at least a portion of a surface of the rubber, rigid substrate or both at a thickness ranging from 20 to 25 μm. The surface areas of the rigid substrate and rubber which are going to be bonded by the adhesive are the interfacial bond areas. The water is then removed by any suitable method such as drying, which may be at ambient conditions or heated to a temperature below where the adhesive composition will react (vulcanize). In one embodiment, a drying temperature may be from 25° C. to 100° C. Any suitable time may be used and can range from a few minutes to several days. To facilitate quicker drying, a vacuum or a flowing atmosphere may be used. The interposing of the aqueous adhesive composition between the rigid substrate and unvulcanized rubber may occur any time after applying the coating of the aqueous adhesive composition. The method of interposing may be any suitable such that there is contact with both the rigid substrate and rubber such that the adhesive coating interposed between them.

The assemblage of the rigid substrate, rubber and interposed adhesive composition is then subjected to vulcanization condition, e.g., heating the rigid substrate, rubber and interposed adhesive composition to a temperature for a time to vulcanize the rubber and adhesive composition thereby bonding the rubber to the substrate. The temperature may be any suitable temperature depending on the rubber being used and desired properties, which is readily determined. The time likewise, may be any suitable time depending on the rubber used and desired properties. An applied pressure may also be employed as desired as known in the art. In one embodiment, a temperature for vulcanization can range from 120° C. to 250° C. In one embodiment, a temperature for vulcanization can range from 140° C. to 200° C. In one embodiment, a time for vulcanization can range from 2 or 3 seconds up to several days depending on the particular application and the size of the particular assemblage. After the process is complete, the bonded adhesive and rubber are fully vulcanized and ready for use in a final application. For example, the vulcanized assembly may be used as engine mount, damper, or belting.

The following examples are provided to illustrate the disclosed compositions, but are not intended to limit the scope thereof. All parts and percentages are by weight unless otherwise indicated.

The following designations, symbols, terms and abbreviations set forth in Table 1 below are used in the Examples:

TABLE 1

| Ingredient | Description | Trade Name | Company |
|---|---|---|---|
| Copolymer latex of 2-chlorobutadiene and methacrylic acid | Polychloroprene latex (ca. 47% in water) | Neoprene 115 | DuPont |
| p-PDNB* | Lower Crystallinity Poly-(1,4-phenyleneazine N,N-dioxide). | PPDNB 2A 50W or 1A 50W | Lord Feinchemie GmbH |
| p-PDNB* | Higher Crystallinity Poly-(1,4-phenyleneazine N,N-dioxide). | PPDNB C 50W | Lord Feinchemie GmbH |
| Homide 121G | 4,4'-Diphenylmethanebismaleimide | Homide 121G | HOS-Technik GmbH |
| Brominated 2,3 dichorlobutadiene | Polymer latex based on brominated 2,3 dichlorobutadiene (ca. 40% in water) | Intermediate B-48 | Dow |
| Chlorosulfonated polyolefin | Chlorosulfonated polyolefin latex (ca. 30% in water) | Thixon B-4 | Dow |
| Resol ($H_2O$ < 5 wt %) | phenolic resol | Bakelite | Hexion |
| Nonyl phenol ethoxylate | Nonionic Surfactant | Igepal | Solvay |
| Fatty alcohol polyalkylene glycol ether | Nonionic Surfactant | Propetal | Zschimmer& Schwarz |
| Zinc Aluminium orthophosphate | Filler | Heucophos ZPA | Heubach |
| Carbon black | Filler | Purex | Gustav GrolmanAN GmbH & Co |
| Special black 5 | Filler | Special black 5 | Gustav Grolman GmbH & Co |
| Zinc Oxide | Filler | Zinc Oxide | Norzinco GmbH |

*The crystallinity of the lower and higher crystallinity poly-(1,4-phenyleneazine N,N-dioxide) is disclosed in WO2017176625.

First Aqueous Composition

The following ingredients and amounts for the first aqueous composition are set forth below in Table 2. The amounts are listed in weight (grams).

TABLE 2

| Components | Weight |
|---|---|
| PPDNB lower crystallinity | 9.6 |
| PPDNB higher crystallinity | 14.4 |
| Heucophos ZPA | 5.4 |
| Carbon black | 5.4 |
| Homide 121G | 4.1 |
| Special black 5 | 1.8 |
| ZnO | 5.4 |
| Surfactant | 3.2 |
| Deionized water | 156 |
| Intermediate B-48 | 23.6 |
| Thixon B-4 | 71.0 |
| Brookfield LV II, 30 rpm, 20° C. | 19 mPa · s |

The first aqueous composition in Table 2 was prepared as follows. The ingredients shown in Table 2 were ball milled together for about 2 h using aqueous media. The viscosity of this adhesive composition was determined according to ASTM-D2196 (Brookfield).

Second Aqueous Composition

The following ingredients and amounts for the second aqueous composition are set forth below in Table 3. The amounts are listed in weight (grams).

TABLE 3

| Components | Weight |
|---|---|
| Copolymer latex of 2-chlorobutadiene and methacrylic acid | 16 |
| Resol ($H_2O$ < 5 wt %), stabilized with sodium polyacrylate | 19 |
| ZnO | 1.5 |
| $ZrO_2$ | 2.2 |
| Surfactant | 0.35 |
| Carbon black | 1.2 |
| $TiO_2$ | 5.8 |

TABLE 3-continued

| Components | Weight |
| --- | --- |
| Silicic acids | 1.6 |
| Deionized water | 52.35 |

The second aqueous composition in Table 3 was prepared according to U.S. Pat. No. 5,962,576.

Examples 1-4 and Comparative Examples a and B

The aqueous adhesive compositions of Examples 1-4 were prepared by blending the first and second aqueous compositions of Tables 2 and 3 and diluted by deionized water. The volumetric mixing ratio and weight percent solids in the aqueous adhesive compositions of Comparative Example A and B and Examples 1-4 diluted by deionized water are set forth below in Table 4.

TABLE 4

| Comp. Ex./Example | Vol. Ratio of First Aqueous Composition to Second Aqueous Composition | Weight Percent Solids in Final Composition |
| --- | --- | --- |
| Comp. Ex. A | 1:0 | 27.1 |
| Comp. Ex. B | 0:1 | 30.9 |
| Example 1 | 3.5:1 | 24.3 |
| Example 2 | 1.7:1 | 23.3 |
| Example 3 | 1:1 | 21.9 |
| Example 4 | 1:2 | 19.6 |

The Brookfield viscosity at 20° C. of the adhesive composition of Example 3 was determined at the following intervals according to ASTM-D2196 as set forth below in Table 5.

TABLE 5

| Brookfield Viscosity Example 3 | |
| --- | --- |
| Time | Brookfield LV II, 30 rpm, 20° C. |
| Day of manufacturing | 515 mPa · s |
| Day 1 | 310 mPa · s |
| Day 3 | 155 mPa · s |
| Day 6 | 158 mPa · s |
| Day 60 | 185 mPa · s |
| 9 months | 418 mPa · s |

In general, typical mixtures of rubber to metal compositions and rubber to metal primer compositions show an increase in viscosity resulting in gelation within a few hours or latest after a few days. Those mixtures therefore show potlife time only. Surprisingly, the viscosity of the aqueous adhesive composition of Example 3 within the scope of the present invention decreased significantly to more than half of the initial viscosity within one day after mixing. The viscosity decreased further after 6 days and remained at this level for at least up to two months. Thus, the aqueous adhesive composition of Example 3 was stable without agglomeration or significantly viscosity increase. Also, the viscosity of Example 3 was stable over a period of 9 months with a slight increase due to the aging behavior. By being stable, the aqueous adhesive composition within the scope of the present invention will allow for a bonding layer between the rubber and rigid surface.

Testing
Buffer Test

The aqueous adhesive compositions of Comparative Example A and B and Examples 1-4 were subjected to a buffer test on natural rubber (NR-65). The buffer test was performed according to tensile test procedure in WDK Guideline 2000 (related to ASTM D 429 F). The natural rubber NR-65 composition is set forth below in Table 6.

TABLE 6

| Natural Rubber 65 Shore A Composition ("NR-65") | |
| --- | --- |
| Ingredients | Content in parts by weight |
| Natural rubber SMR 5 CV 60 | 100 |
| Stearic acid | 2.5 |
| ZnO | 5.0 |
| Naftolen ZD | 2.0 |
| Carbon black N 220 | 50 |
| IPPD Vulkanox 4010 NA | 0.4 |
| Sulfur | 2.6 |
| Rhenogran CBS | 0.5 |

The aqueous adhesive compositions of Comparative Examples A and B and Examples 1-4 were bonded to steel (ST 37) and the natural rubber composition NR-65 as follows.

Bonded parts were pulled to destruction after curing (vulcanization) according to tensile test procedure in WDK Guideline 2000 (related to ASTM D 429 F) and the fracture pattern in the rubber % was determined by visual assessment (herein "% R). To perform the test, the steel was cleaned and grit blasted. The preheated (40 to 80° C.) metal surface was coated with the aqueous adhesive compositions of Comparative Example A and B and Examples 1-4 by spraying application to a thickness of about 20 to 25 μm. The coating layer was dried at 80° C. for 8 minute. The coated steel was then bonded to natural rubber NR-65 by transfer molding the rubber on the coated steel part at 160° C. (heated vulcanization press) for 10 minutes (NR-65). The characteristic tensile test was performed after cooling over night at room temperature. Also, as a reference, the aqueous adhesive composition of Comparative Example B was first applied to the steel as described above. Next, the aqueous adhesive composition of Comparative Example A was applied over the first coating by spraying application to a thickness of 15 μm to 25 μm and dried again at 80° C. for 8 minutes. The bonding characteristics of these adhesive compositions are shown in Table 7.

TABLE 7

| Standard buffer test on natural rubber (NR-65) | | | | | | |
| --- | --- | --- | --- | --- | --- | --- |
|  | Comp. Ex. A | Comp. Ex. B | Ex. 1 | Ex. 2 | Ex. 3 | Ex. 4 |
| Tensile Strength [MPa] NR-65 | 12.3 | 11.6 | 12.5 | 12.6 | 11.8 | 7.4 |
| Fracture pattern in rubber [% R] NR-65 | 97 | 98 | 99 | 96 | 99 | 91 |
| Metal failure [% M] NR-65 | 1 | 1 | 1 | 3 | 1 | 0 |

Resistance Tests

The bonded assemblies were first tested for stability by immersing the bonded assemblies in boiling hot water at 95°

C. for 24 hours, and then measuring the tensile strength of the bonded assemblies. The results of the tensile strength are set forth in Table 8. As can be seen, all of the bonded assemblies survived the boiling water test with little to no damage.

TABLE 8

Boiling water resistance buffer test

| | Comp. Ex. A | Comp. Ex. B | Ex. 1 | Ex. 2 | Ex. 3 | Ex. 4 | M 538 |
|---|---|---|---|---|---|---|---|
| Tensile Strength [MPa] NR-65 | 10.4 | 9.4 | 10.1 | 11.3 | 9.9 | 9.6 | 9.4 |
| Fracture pattern in rubber [% R] NR-65 | 96 | 96 | 96 | 95 | 96 | 95 | 94 |
| Metal failure [% M] NR-65 | 3 | 4 | 1 | 2 | 4 | 0 | 6 |

The bonded assemblies were also tested for stability by immersing the bonded assemblies in hot glycol at 100° C. for 7 days, and then measuring the tensile strength of the bonded assemblies. The results of the tensile strength are set forth in Table 9. As can be seen, the severe testing in glycol differentiated the bonded assemblies significantly. The bonded assemblies prepared with the aqueous adhesive composition of Comparative Example B and a solvent based standard grade MEGUM 538 (M 538) adhesive failed with significant metal failure. The bonded assemblies prepared with the aqueous adhesive compositions of Examples 1-4 showed improved stability against hot glycol significantly as the ratio increased with the bonded assembly prepared with the aqueous adhesive composition of Example 3 performing the best.

TABLE 9

Hot glycol resistance buffer test

| | Comp. Ex. A | Comp. Ex. B | Ex. 1 | Ex. 2 | Ex. 3 | Ex. 4 | M 538 |
|---|---|---|---|---|---|---|---|
| Tensile Strength [MPa] NR-65 | 10.3 | 1.7 | 3.7 | 7.4 | 9.2 | 7.1 | 2.0 |
| Fracture pattern in rubber [% R] NR-65 | 96 | 37 | 80 | 92 | 95 | 96 | 41 |
| Metal failure [% M] NR-65 | 4 | 63 | 20 | 8 | 5 | 0 | 59 |

What is claimed is:

1. An aqueous adhesive composition which comprises an admixture of:
(a) a first aqueous composition comprising, (i) one or more film forming polymers, (ii) one or more lower crystallinity polynitroso compounds, (iii) one or more higher crystallinity polynitroso compounds, and (iv) one or more bismaleimide-containing monomers; and
(b) a second aqueous composition comprising (i) an aqueous dispersion of at least one phenolic resin which is a condensation product of a phenol and formaldehyde, wherein the aqueous dispersion is stabilized by at least one polyacrylate derived from a monomer represented by Formula I:

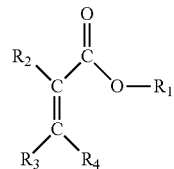

wherein $R_1$ is H, $CH_3$, $C_2$ to $C_4$ alkyl or $C_6$ to $C_{12}$ aryl; $R_2$ is H, OH, CN, $CH_3$, $C_2$ to $C_8$ alkyl, or a halogen; and $R_3$ and $R_4$ are each independently H, $CH_3$, $C_2$ to $C_8$ alkyl, $C_6$ to $C_{12}$ aryl, O—$CH_3$, O—$C_2$ to $C_8$ alkyl, and O-aryl; (b) one or more latices formed from one or more halogenated polyolefins; and (c) one or more metal oxides.

2. The aqueous adhesive composition according to claim 1, wherein the one or more film forming polymers are a halogenated olefin polymer.

3. The aqueous adhesive composition according to claim 1, wherein the one or more film forming polymers are a halogenated substituted polydiene polymer.

4. The aqueous adhesive composition according to claim 1, wherein the one or more lower crystallinity polynitroso compounds has a crystallinity of less than 30% by weight as determined by X-ray diffraction and the one or more higher crystallinity polynitroso compounds has crystallinity of greater than 40% by weight as determined by X-ray diffraction.

5. The aqueous adhesive composition according to claim 4, wherein the one or more lower crystallinity polynitroso compounds and the one or more higher crystallinity polynitroso compounds are poly-(1,4-phenylyenazine-N,N-dioxide).

6. The aqueous adhesive composition according to claim 1, wherein a weight ratio of the one or more lower crystallinity polynitroso compounds to the one or more higher crystallinity polynitroso compounds is 1:2 to 2:1.

7. The aqueous adhesive composition according to claim 1, wherein the one or more bismaleimide-containing monomers are represented by the formula:

wherein R is a alkylene, cycloalkylene, heterocyclic, arylene, mixtures thereof.

8. The aqueous adhesive composition according to claim 1, wherein the first aqueous composition comprises:
(i) 2 wt. % to 75 wt. %, based on the total weight of the first aqueous composition, of the one or more film forming polymers,
(ii) 2 wt. % to 30 wt. %, based on the total weight of the first aqueous composition, of the one or more lower crystallinity polynitroso compounds,
(iii) 3 wt. % to 30 wt. %, based on the total weight of the first aqueous composition, of the one or more higher crystallinity polynitroso compounds, and
(iv) 0.1 wt. % to 15 wt. %, based on the total weight of the first aqueous composition, of the one or more bismaleimide-containing monomers.

9. The aqueous adhesive composition according to claim 1, wherein the polyacrylate is an alkali or ammonium salt of a polyacrylic acid and/or a substituted polyacrylic acid.

10. The aqueous adhesive composition according to claim 1, wherein the one or more latices formed from one or more halogenated polyolefins comprises an emulsion copolymer of a chlorinated polyolefin with an ethylenically unsaturated monomer.

11. The aqueous adhesive composition according to claim 1, wherein the second aqueous composition comprises:
    (i) 2 wt. % to 30 wt. %, based on the total weight of the second aqueous composition, of the aqueous dispersion of at least one phenolic resin,
    (ii) 5 wt. % to 40 wt. %, based on the total weight of the second aqueous composition, of the one or more latices formed from one or more halogenated polyolefins, and
    (iii) 3 wt. % to 30 wt. %, based on the total weight of the second aqueous composition, of the one or more metal oxides.

12. The aqueous adhesive composition according to claim 1, further comprising a surfactant and carbon black.

13. The aqueous adhesive composition according to claim 1, wherein the first aqueous composition and second aqueous composition are admixed in a volume ratio of the first aqueous composition to the second aqueous composition of 10:0.5 to 0.5:10.

14. The aqueous adhesive composition according to claim 1, having a Brookfield viscosity of from 10 to 1500 cPs at 20° C.

15. A bonded assembly comprising;
    (a) a rigid substrate having an interfacial bond area,
    (b) an unvulcanized rubber; and
    (c) an aqueous adhesive composition bonding the rigid substrate to the unvulcanized rubber; wherein the aqueous adhesive composition comprises an admixture of:
        (i) a first aqueous composition comprising, (1) one or more film forming polymers, (2) one or more lower crystallinity polynitroso compounds, (3) one or more higher crystallinity polynitroso compounds, and (4) one or more bismaleimide-containing monomers; and
        (ii) a second aqueous composition comprising (1) an aqueous dispersion of at least one phenolic resin which is a condensation product of a phenol and formaldehyde, wherein the aqueous dispersion is stabilized by at least one polyacrylate derived from a monomer represented by Formula I:

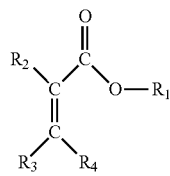

wherein $R_1$ is H, $CH_3$, $C_2$ to $C_4$ alkyl or $C_6$ to $C_{12}$ aryl; $R_2$ is H, OH, CN, $CH_3$, $C_2$ to $C_8$ alkyl, or a halogen; and $R_3$ and $R_4$ are each independently H, $CH_3$, $C_2$ to $C_8$ alkyl, $C_6$ to $C_{12}$ aryl, O—$CH_3$, O—$C_2$ to $C_8$ alkyl, and O-aryl; (2) one or more latices formed from one or more halogenated polyolefins; and (3) one or more metal oxides.

16. The bonded assembly according to claim 15, wherein the rigid substrate is steel.

17. The bonded assembly according to claim 15, wherein the first aqueous composition and second aqueous composition are admixed in a volume ratio of the first aqueous composition to the second aqueous composition of 10:0.5 to 0.5:10.

18. The bonded assembly according to claim 15, after heating the bonding assembly to a vulcanization temperature and under pressure for a time sufficient to vulcanize the unvulcanized rubber and the aqueous adhesive composition thereby bonding the rubber to the rigid substrate.

19. A method for bonding rubber to a rigid substrate, the method comprising:
    (a) interposing an aqueous adhesive composition between at least a portion of a rigid substrate and an unvulcanized rubber to form an assemblage, wherein the aqueous adhesive composition comprises:
        (i) a first aqueous composition comprising, (a) one or more film forming polymers, (2) one or more lower crystallinity polynitroso compounds, (3) one or more higher crystallinity polynitroso compounds, and (4) one or more bismaleimide-containing monomers; and
        (ii) a second aqueous composition comprising (1) an aqueous dispersion of at least one phenolic resin which is a condensation product of a phenol and formaldehyde, wherein the aqueous dispersion is stabilized by at least one polyacrylate derived from a monomer represented by Formula I:

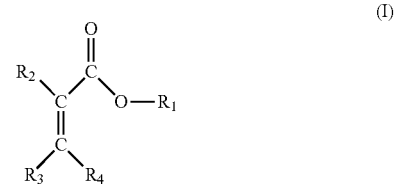

wherein $R_1$ is H, $CH_3$, $C_2$ to $C_4$ alkyl or $C_6$ to $C_{12}$ aryl; $R_2$ is H, OH, CN, $CH_3$, $C_2$ to $C_8$ alkyl, or a halogen; and $R_3$ and $R_4$ are each independently H, $CH_3$, $C_2$ to $C_8$ alkyl, $C_6$ to $C_{12}$ aryl, O—$CH_3$, O—$C_2$ to $C_8$ alkyl, and O-aryl; (2) one or more latices formed from one or more halogenated polyolefins; and (3) one or more metal oxides; and
    (b) heating the assemblage to a vulcanization temperature and under pressure for a time sufficient to vulcanize the unvulcanized rubber and the aqueous adhesive composition thereby bonding the rubber to the rigid substrate.

20. The method according to claim 19, wherein the first aqueous composition and second aqueous composition are admixed in a volume ratio of the first aqueous composition to the second aqueous composition of 10:0.5 to 0.5:10.

* * * * *